(12) United States Patent
Steiner et al.

(10) Patent No.: US 9,412,155 B2
(45) Date of Patent: Aug. 9, 2016

(54) VIDEO SYSTEM WITH DYNAMIC CONTRAST AND DETAIL ENHANCEMENT

(71) Applicant: Karl Storz Imaging, Inc., Goleta, CA (US)

(72) Inventors: Martin Steiner, Uhwiesen (CH); Jonathan Bormet, Goleta, CA (US); Gaurav Sharma, Goleta, CA (US)

(73) Assignee: Karl Storz Imaging, Inc., Goleta, CA (US)

( * ) Notice: Subject to any disclaimer, the term of this patent is extended or adjusted under 35 U.S.C. 154(b) by 396 days.

(21) Appl. No.: 13/731,780

(22) Filed: Dec. 31, 2012

(65) Prior Publication Data

US 2014/0184916 A1     Jul. 3, 2014

(51) Int. Cl.
    *H04N 7/18*     (2006.01)
    *G06T 5/00*     (2006.01)

(52) U.S. Cl.
    CPC ........ *G06T 5/007* (2013.01); *G06T 2207/10068* (2013.01); *G06T 2207/20028* (2013.01); *G06T 2207/30092* (2013.01)

(58) Field of Classification Search
    CPC .............. G06T 5/007; G06T 2207/30092; G06T 2207/20028; G06T 2207/10144; G06T 2207/10068
    USPC ....................... 375/240.26; 348/607
    See application file for complete search history.

(56) References Cited

U.S. PATENT DOCUMENTS

| | | | |
|---|---|---|---|
| 4,742,388 A | 5/1988 | Cooper et al. | |
| 4,799,104 A | 1/1989 | Hosoya et al. | |
| 4,831,437 A | 5/1989 | Nishioka et al. | |
| 5,416,511 A | 5/1995 | Ishikawa et al. | |
| 6,147,705 A | 11/2000 | Krauter et al. | |
| 6,889,075 B2 | 5/2005 | Marchitto et al. | |
| 7,050,086 B2 | 5/2006 | Ozawa | |
| 7,236,621 B2 | 6/2007 | Kobayashi et al. | |
| 7,420,151 B2 | 9/2008 | Fengler et al. | |
| 7,632,227 B2 | 12/2009 | Sugimoto et al. | |
| 7,822,247 B2 | 10/2010 | Ikemoto | |

(Continued)

FOREIGN PATENT DOCUMENTS

EP      1413985 A2     4/2004

OTHER PUBLICATIONS

Kovacs et al., Exponential Contrast Maximization of Intensity Images, 7th International Symposium on Image and Signal PRocessing and Analysis (ISPA 2011), Sep. 4-6, 2011.*

(Continued)

*Primary Examiner* — Jay Au Patel
*Assistant Examiner* — Francis G Geroleo
(74) *Attorney, Agent, or Firm* — Whitmyer IP Group LLC

(57) ABSTRACT

A method and system for real time luminance correction and detail enhancement of a video image including the steps of extracting a luminance component from a video image, separating the luminance component into an illumination layer and a scene reflectivity layer, the illumination layer having a dynamic range, compressing the dynamic range of the illumination layer to generate a corrected illumination layer, filtering the reflectivity layer to generate an enhanced reflectivity layer; and combining the corrected illumination layer with the enhanced scene reflectivity layer to generate an enhanced luminance image, is provided. A system for real time luminance correction and detail enhancement of a video image is also provided.

18 Claims, 8 Drawing Sheets
(3 of 8 Drawing Sheet(s) Filed in Color)

(56) References Cited

U.S. PATENT DOCUMENTS

| | | | |
|---|---|---|---|
| 7,822,248 B2 | 10/2010 | Ikemoto | |
| 7,860,329 B2 | 12/2010 | Ozawa | |
| 8,447,132 B1* | 5/2013 | Galil | 382/274 |
| 2002/0016533 A1 | 2/2002 | Marchitto et al. | |
| 2007/0279500 A1* | 12/2007 | Castorina et al. | 348/254 |
| 2008/0239070 A1 | 10/2008 | Westwick et al. | |
| 2009/0303317 A1 | 12/2009 | Tesar | |
| 2010/0087741 A1 | 4/2010 | Douplik et al. | |
| 2010/0303372 A1* | 12/2010 | Zhao et al. | 382/254 |
| 2011/0285737 A1* | 11/2011 | Lin | 345/589 |
| 2011/0310116 A1* | 12/2011 | Muijs | 345/617 |
| 2012/0170843 A1 | 7/2012 | Lin | |
| 2012/0236020 A1* | 9/2012 | Paris et al. | 345/589 |
| 2013/0121572 A1* | 5/2013 | Paris et al. | 382/166 |
| 2013/0257887 A1* | 10/2013 | Xu et al. | 345/589 |

OTHER PUBLICATIONS

Matsumoto et al., Noise reduction and edge enhancement based on band-pass epsilon-filter, 2009 International Conference on Information Management and Engineering, Apr. 3-5, 2009.*

Smith, "Color Gamut Transform Pairs"; Jan. 1, 1978; pp. 12-19.

European Search Report, Application No. EP 13 19 8823, Completed: Apr. 10, 2014; Mailing Date: Apr. 22, 2014, 13 pages.

Grzegorz Krawczyk, et al.; "HDR Tone Mapping"; Springer Berlin Heidelberg 2007; pp. 147-177.

European Office Action, Application No. 13198823.0, completed: Jan. 4, 2016, 6 Pages.

S. Paris, et al., "A Gentle Introduction to Bilateral Filtering and its Applications" (2007) (available at: http://people.csail.mit.edu/sparis/bf_course/); 3 pages.

S. Paris, et al., "Bilateral Filtering: Theory and Applications", Foundations and Trends(R) in Computer Graphics and Vision vol. 4, No. 1 (2008) 1-73.

J. Kuang, et al., "Evaluating HDR Rendering Algorithms" (2006) (available at http://www.cis.rit.edu/fairchild/PDFs/PAP24.pdf); 30 pages.

Durand and Dorsey, "Fast Bilateral Filtering for the Display of High-Dynamic-Range Images" (2002) (available at: http://people.csail.mit.edu/fredo/PUBLI/Siggraph2002/); 5 pages.

Expired U.S. Appl. No. 60/727,479, Title: Device for Short Wavelength Visible Reflectance Endoscopy Using Broadband Illumination and Image Procesing, Techniques, Inventor: John J.P. Fengler, et al., Dated: Oct. 17, 2005.

Expired U.S. Appl. No. 60/908,373, Title: Illumination With Leds for White and Fluorescence Endoscopy, Inventor: David Potkins, Dated: Mar. 27, 2007.

\* cited by examiner

VIDEO SYSTEM WITH DYNAMIC CONTRAST AND DETAIL ENHANCEMENT

FIELD OF THE INVENTION

The present invention relates to a method and system for real time correction and enhancement of video images and, in particular, to a method and system for correcting a video image for illumination and exposure deficiencies based on an analysis of the luminance or, alternatively, the max (R,G,B) component, and for detail enhancement.

BACKGROUND OF THE INVENTION

In the context of surgical applications Illumination and exposure deficiencies are judged by an observer based on the appearance of the rendered digital video image on the monitor. The video monitor or display is therefore part of the visualization system and its properties like dynamic range and linearity have to be taken into account to improve the viewing experience. The goal of a correction for surgical video would be:

Correct the digital image, so that when displayed on a particular monitor the total image area dynamic range matches the dynamic range of the human visual system within an almost fixed iris aperture, while preserving the contrast of image details to produce a reproduction of the scene that appears natural and adequate to the observer.

The requirement for natural and adequate reproduction can be contradictory in itself. Natural in this context means that the observer feels like he is looking at the original scene. Adequate means that illumination and exposure deficiencies are removed that would normally force the human visual system to continuously locally adapt to different illumination or reflectivity conditions. Though, a purely reflectivity based approach eliminating all illumination "artifacts" would actually not appear natural to the observer and can impact his orientation and therefore his navigation ability within the scene. Shadows for example are illumination artifact that actually supports the human eye's visual depth perception especially if a monocular versus stereoscopic system is used.

Prior-art systems do not provide for real-time correction of endoscopic video images to reproduce, on a surgical monitor, a natural and adequate representation of the surgical site.

SUMMARY OF THE INVENTION

Accordingly, it is an object of the present invention to provide a method and system for the real-time luminance correction and detail enhancement of video images. These and other objectives are achieved by providing a method comprising the steps of calculating a luminance component of each pixel of each frame of a real-time video image signal; generating a base image for each frame of a video image signal by applying an adaptive bilateral filter to said luminance component of each pixel in said frame; generating a detail image for each frame of a video input signal by taking the difference between said luminance component of each pixel in said frame and said base image; identifying any dark pixels in the base image; generating a compressed base image by linearly compressing dark pixels in the base image towards a setpoint; generating an enhanced luminance image for each frame of said video input signal by adding the detailed image to the compressed base image; generating a gain map for each frame of a video input signal by subtracting the luminance component from the enhanced luminance image for said frame; and multiplying the gain map to each RGB channel of a video display independently.

The method may further include the step of converting the luminance component into log space to generate a log luminance component. The step of generating a gain map may comprise generating a log gain map for each frame of a video input signal by subtracting said log luminance component from the enhanced luminance image for said frame. In this embodiment, the method may then further include the step of converting the log gain map to a linear gain map with an antilog conversion.

The luminance component may be calculated according to the following formula:

$$Y_{x,y}[R\ G\ B]_{x,y} \times \begin{bmatrix} y_r \\ y_g \\ y_b \end{bmatrix}$$

Where R, G and B are the values of red, green and blue pixels and $y_r$, $y_g$ and $y_b$ are luminance coefficients for red, green and blue color channels.

In another embodiment, the luminance component may be calculated by deriving a max(R,G,B) component from the video input signal.

The base image is generated according to the following formula:

$$\text{Base\_image}_{x,y} = 2^{BF[\log2(Y_{x,y})]_{x,y}}$$

Where, $$BF[Y]_{x,y} = \frac{1}{W(x,y)} \sum_{n=x-\frac{(ks-1)}{2}}^{x+\frac{(ks-1)}{2}} \sum_{m=y-\frac{(ks-1)}{2}}^{y+\frac{(ks-1)}{2}} G_{\sigma_x}(|x-n|)$$

$$G_{\sigma_y}(|y-m|)G_{\sigma_Y}(|Y(x,y)-Y(n,m)|)Y(n,m)$$

$$G_\sigma(x) = \frac{1}{2\pi\sigma^2}\exp\left(-\frac{x^2}{2\sigma^2}\right)$$

$$W(x,y) = \sum_{n=x-\frac{(ks-1)}{2}}^{x+\frac{(ks-1)}{2}} \sum_{m=y-\frac{(ks-1)}{2}}^{y+\frac{(ks-1)}{2}} G_{\sigma_x}(|x-n|)G_{\sigma_y}(|y-m|)G_{\sigma_Y}(|Y(x,y)-Y(n,m)|).$$

The detail image is generated according to the following formula:

$$\text{Detail\_image}_{x,y} = \frac{Y_{x,y}}{\text{Base\_image}_{x,y}}$$

The compressed base image may be generated according to the following formula:

$$\text{Base\_image\_compressed}_{x,y} = 2^{(C \cdot [\log 2(\text{Base\_image}) - \log 2(M_{target})] + \log 2(M_{target}))}$$

Where C is the compression factor $\{0,1\}$ and $M_{target}$ is the target mean level.

The method may also include the step of generating an enhanced detail image by adding a gain to each pixel of the detail image. The enhanced detailed image may be generated according to the following formula:

$$CE[Y_{details}]_{x,y} = Y_{x,y}^E$$

Where I is the input image (here the detail Image) with $\{I, 0 \ldots 1\}$ and E is an exponent $\{E, E>1\}$.

In another aspect, a system for real time luminance correction and detail enhancement of a video image is provided. The system may include a memory for storing image data and a processor. The processor may be configured to execute a bilateral low-pass filter; a tone-compression module; and a local detail enhancement module. The bilateral lowpass filter may be represented by the formula:

$$BF[Y]_{x,y} = \frac{1}{W(x,y)} \sum_{n=x-\frac{(ks-1)}{2}}^{x+\frac{(ks-1)}{2}} \sum_{m=y-\frac{(ks-1)}{2}}^{y+\frac{(ks-1)}{2}} G_{\sigma_x}(|x-n|)$$

$$G_{\sigma_y}(|y-m|) G_{\sigma_Y}(|Y(x,y) - Y(n,m)|) Y(n,m)$$

Where, $$G_\sigma(x) = \frac{1}{\sqrt{2\pi\sigma^2}} \exp\left(-\frac{x^2}{2\sigma^2}\right);$$

$$Y_{x,y} = [R\ G\ B]_{x,y} \times \begin{bmatrix} y_r \\ y_g \\ y_b \end{bmatrix},$$

where R, G and B are the values of the red, green and blue pixels and yr, yg and yb are the luminance coefficients for the red, green and blue color channels to compute the luminance output Y; and $$W(x, y) =$$

$$\sum_{n=x-\frac{(ks-1)}{2}}^{x+\frac{(ks-1)}{2}} \sum_{m=y-\frac{(ks-1)}{2}}^{y+\frac{(ks-1)}{2}} G_{\sigma_x}(|x-n|) G_{\sigma_y}(|y-m|) G_{\sigma_Y}(|Y(x,y) - Y(n,m)|).$$

The tone-compression module may be configured to compress the dynamic range of said image towards a setpoint. The local detail enhancement module may be provided as a non-linear filter represented by the following formula:

$$CE[Y_{details}]_{x,y} = Y_{x,y}^E$$

Where I is a image input to said local detail enhancement module, with $\{I, 0 \ldots 1\}$ and E is an exponent $\{E, E>1\}$.

In yet another aspect of the invention, a method for real time luminance correction and detail enhancement of a video image is provided. The method may include the steps of: extracting a luminance component from said video image; separating said luminance component into an illumination layer and a scene reflectivity layer, said illumination layer having a dynamic range; compressing the dynamic range of said illumination layer to generate a corrected illumination layer; filtering said reflectivity layer to generate an enhanced reflectivity layer; and combining said corrected illumination layer with said enhanced scene reflectivity layer to generate an enhanced luminance image. The luminance component may be provided as a max(R,G,B) component.

The step of compressing the dynamic range of said illumination layer may comprise increasing the lightness of dark regions of said image. The step of compressing the dynamic range of said illumination layer may also comprise decreasing the lightness of over-illuminated regions of said image. The step of filtering said reflectivity layer may include applying a non-linear filter using an exponential pixel intensity mapping function. In another embodiment, the step of filtering said reflectivity layer may include applying a band-pass filter having a specific frequency sub-band of said image.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
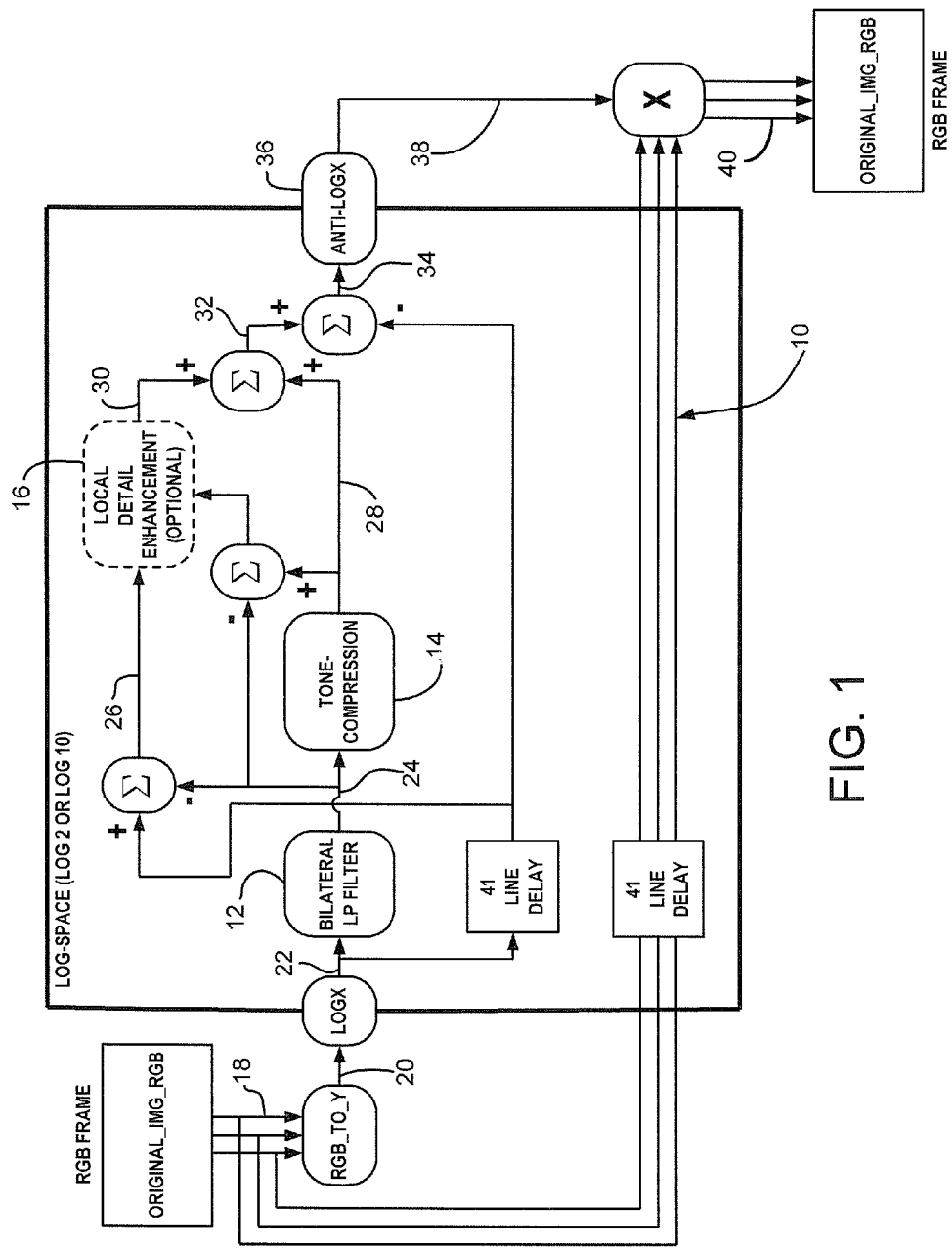
FIG. 1 is a block diagram of an embodiment of the system for dynamic contrast and detail enhancement.

A Dynamic Contrast and Detail Enhancement (DCE) system 10 and process that will correct a video image for illumination and exposure deficiencies in real time is provided herein. The correction will compress the dynamic range, especially increase the lightness of dark regions and reduce lightness in over illuminated/exposed regions. Thus, the appearance of the rendered image is optimized for the human visual system. The luminance component of the image is separated into its scene reflectivity and illumination layers. The illumination layer is then compressed and combined again with the scene reflectivity layer. The overall effect will be an improved lightness in all regions of the image. Correction may be based on analysis of the luminance, or alternatively, the max(R,G,B), component.

The following criteria are indicators of illumination deficiencies:

The dynamic range of the sampled version of an illuminated scene is larger relative to the dynamic range of the scene reflectivity only. This typically can be observed as vignette or shadows.

The dynamic range of the rendered monitor image is larger than the dynamic range of the human visual system at a given Iris aperture. A larger dynamic range would force the eye to continuously adapt the Iris aperture while it is scanning the image spatially. This reduces the overall traceability of structures and motion in the scene.

The system and process also allow for detail enhancement, which can be obtained by filtering (contrast enhancement) the reflectivity layer before combining it back with the compressed illumination layer.

Generally, the DCE system 10 generates a custom gain for each pixel by analyzing the luminance and comparing it to a setpoint. To create the gain map, the RGB signal 18 is either: (1) decomposed into a luminance component 20; or (2) used to generate a max(R,G,B) component. In the embodiment of the system 10 shown in FIG. 1, the RGB input signal 18 is decomposed into a luminance component 20, which is first converted to log space. The log luminance 22 is filtered with an edge preserving lowpass filter—implemented as a 41×41 separable bilateral filter 12. The bilateral filter 12 is adaptive to the intensity values of the pixels within the operating window of the filter. The bilateral filter output is called the base image 24 (or illumination layer). The difference between the filter input 22 and the base image 24 generates a detail image 26 (or reflection layer), containing primarily texture information. In the tone-compression module 14, dark values in the base image are linerally compressed (linear in log space) towards a setpoint to generate a modified base image 28. The detail image 26 is optionally enhanced with a gain to generate an enhanced detail image 30, which is then added back to the modified base image 28 to form an enhanced luminance image 32 with increased brightness. The original log luminance 22 is then subtracted from this enhanced log luminance image 32 to generate the gain map 34 in log space. This operation is equivalent to dividing the linear enhanced luminance by the linear input luminance. The log gain map 34 is then made linear with an antilog conversion 36, and the linear gain map 38 is applied (multiplied) to each RGB color channel independently to generate a corrected and enhanced RGB color image 40.

Figure 2:
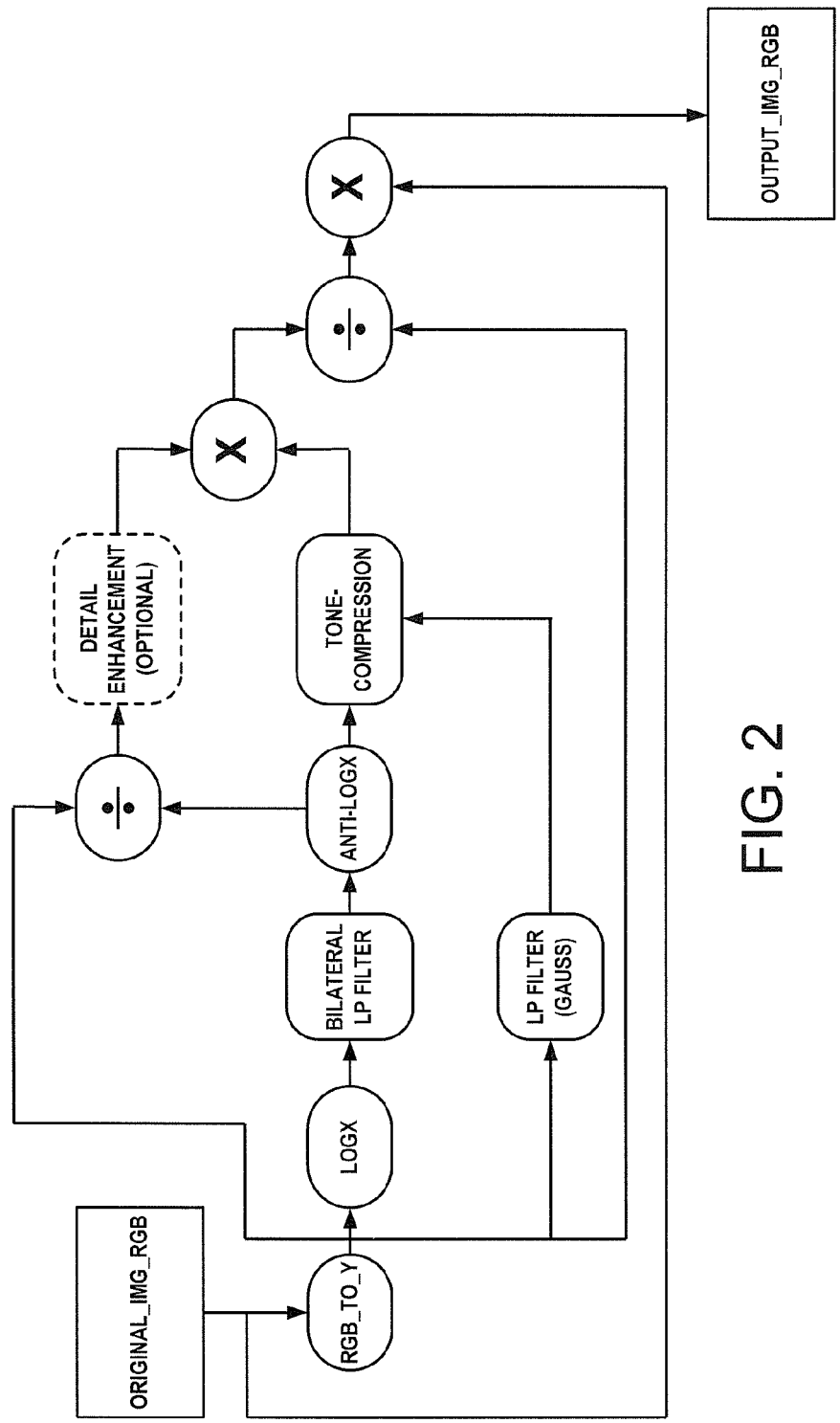
FIG. 2 is a block diagram of another embodiment of the system for dynamic contrast and detail enhancement.

As shown in FIG. 1, the proposed system 10 includes a bilateral low pass (LP) filter 12, the principles and theory of which are described in S. Paris, et al., *Bilateral Filtering: Theory and Applications*, Foundations and Trends® in Computer Graphics and Vision Vol. 4, No. 1 (2008) 1-73, a tone compression module 14, applied on the output of the bilateral filtered luminance component (also referred to as the illumination layer), and a detail enhancement module 16. An alternative embodiment of the system with bilateral filter is shown in FIG. 2.

Figure 3B:
FIG. 3B is an output image, shown in color, having been processed according to the system and method of the present application.
Figure 3A:
FIG. 3A is an unprocessed video image, shown in color.

The expected results of the filter are shown in FIG. 3, with the digital post illumination filtered on the right and the original on the left.

The proposed method allows varying the frequency response of the bilateral low pass filter 12 for the extraction of a base_image 24 and a detail_image 26. The optimal frequency response and the compression strength can be determined by empirical studies, where the frequency response can be controlled by the observer.

The bilateral low pass filter approach has been shown in various HDR tone-mapping applications to be an effective tool to approximate the extraction of the illumination layer in a digital image. See, e.g. S. Paris, et al., *A Gentle Introduction to Bilateral Filtering and its Applications* (2007) (available at: http://people.csail.mit.edu/sparis/bf_course/); Durand and Dorsey, *Fast Bilateral Filtering for the Display of High-Dynamic-Range Images* (2002) (available at: http://people.csail.mit.edu/fredo/PUBLI/Siggraph2002/); and J. Kuang, et al., Evaluating HDR Rendering Algorithms (2006) (available at http://www.cis.rit.edu/fairchild/PDFs/PAP24.pdf). Earlier methods using only a simple low pass filter have problems with abruptly changing area boundaries and result in undesirable contouring and aura effects in these transient regions.

The bilateral low pass filter output is only an approximation to the illumination layer. It is not possible to clearly distinguish between the reflectivity and illumination if either is not known before. The bilateral filter method cannot distinguish between very low illumination of an area versus very low reflectivity of the illuminated area. But, in both cases the specific area will most likely need a lightness adjustment to accommodate the displayed image to the human visual system, especially if the details in that area consist of relatively small modulations. In some cases, use of max(R,G,B) will result in a less dramatic compression on dark red tissue, such as that found in the liver, because the local luminance is relatively low, while max(R,G,B) is relatively high. This represents a different tradeoff between 'natural' (less perceived change in color than in the luminance case) and 'adequate' (dynamic range not as compressed).

As the bilateral filter is only an approximation of the illumination layer, we will call the output of the bilateral low pass filter the base_img 20 and the corresponding reflectivity layer the details_img 22.

The RGB image 18 is converted to log space before it is filtered and back to linear thereafter. Log space maps better to the perception of lightness differences in the human visual system. The Gaussian filter for the pixel intensity based dimension of the bilateral filter can then be linear.

The following equation represents the bilateral low pass filter output:

$$BF[Y]_{x,y} = \frac{1}{W(x,y)} \sum_{n=x-\frac{(ks-1)}{2}}^{x+\frac{(ks-1)}{2}} \sum_{m=y-\frac{(ks-1)}{2}}^{y+\frac{(ks-1)}{2}} G_{\sigma_x}(|x-n|)$$

$$G_{\sigma_y}(|y-m|) G_{\sigma_Y}(|Y(x,y)-Y(n,m)|) Y(n,m)$$

Where $G_\sigma$ returns the Gaussian weighting coefficients used for the spatial and intensity-based weighting:

$$G_\sigma(x) = \frac{1}{\sqrt{2\pi\sigma^2}} \exp\left(-\frac{x^2}{2\sigma^2}\right)$$

The luminance output (Y) 20 is provided by:

$$Y_{x,y} = [R\ G\ B]_{x,y} \times \begin{bmatrix} y_r \\ y_g \\ y_b \end{bmatrix}$$

Where R, G and B are the values of the red, green and blue pixels and yr, yg and yb are the luminance coefficients for the red, green and blue color channels to compute the luminance output Y.

Alternatively, the max(R,G,B) may be substituted for the definition of Y given above. This is no longer a proper 'luminance' signal but is nevertheless a useful space for determining exposure deficiencies. This is particularly true if the exposure routine operates in the max(R,G,B) space. Gross mismatches between the base image colorspace and the exposure colorspace may cause the compression to tend towards a global, rather than local gain.

W(x,y) returns the normalization factor:

$$W(x, y) = \sum_{n=x-\frac{(ks-1)}{2}}^{x+\frac{(ks-1)}{2}} \sum_{m=y-\frac{(ks-1)}{2}}^{y+\frac{(ks-1)}{2}} G_{\sigma_x}(|x-n|) G_{\sigma_y}(|y-m|) G_{\sigma_Y}(|Y(x,y) - Y(n,m)|)$$

The Base_image 24, which approximates the illumination layer, is calculated by:

$$\text{Base\_image}_{x,y} = 2^{BF[\log 2(Y_{x,y})]_{x,y}}$$

Using the Base_image 24, the Detail_image 26, which approximates the reflectivity layer, can be extracted:

$$\text{Detail\_image}_{x,y} = \frac{Y_{x,y}}{\text{Base\_image}_{x,y}}$$

Figures 4A, 4B, 4C:
FIG. 4A is an unprocessed video image, shown in color.
FIG. 4B is a base image, or illumination layer, as generated from the video image of FIG. 4A, in accordance with the system and method of the present application.
FIG. 4C is a detail image, or reflectivity layer, as generated from the video image of FIG. 4A and FIG. 4B, in accordance with the system and method of the present application.

FIG. 4B illustrates an example of the Base_image, calculated using the bilateral filter from an unprocessed RGB image as shown in FIG. 4A, and FIG. 4C illustrates an example of a Detail_image, extracted from the Base_image of FIG. 4B.

Parts of the illumination layer help the observer in the perception of depth in a scene. Therefore, as it carries some vital information of the scene the complete illumination layer is not removed, but instead, the effect is reduced to improve the viewing experience. The exact strength of the compression may be determined experimentally by conduction a series of visual tuning experiments with expert observers. Compression of the base_image 24 is carried out in the tone-compression module 14. The output of the tone-compression module 14 is the base_image_compressed 28.

An example compression method can be expressed as:

$$\text{Base\_image\_compressed}_{x,y} = 2^{(C \cdot [\log 2(\text{Base\_image}) - \log 2(M_{target})] + \log 2(M_{target}))}$$

Where C is the compression factor {0,1} and $M_{target}$ is the target mean level.

The compression method expressed above compresses the intensity values of an image towards the target mean level, a setpoint. Using a compression factor C=0 would result in a flat Base_image with a mean level equal to $M_{target}$. Using a Compression factor C=1 would have no effect on target the image.

Figure 5B:
FIG. 5B is a compressed base image, as generated from the base image of FIG. 5A, in accordance with the system and method of the present application.
Figure 5A:
FIG. 5A is a base image, or illumination layer, as generated from the video image of FIG. 4A, in accordance with the system and method of the present application.
Figure 6A:
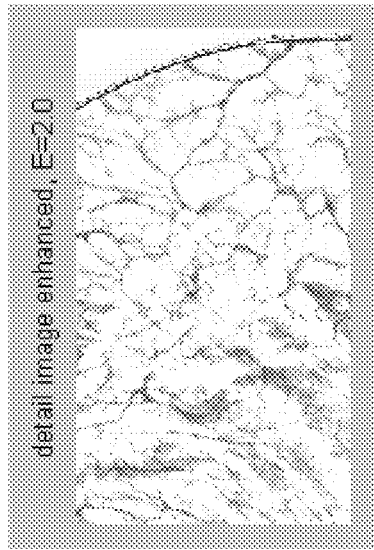
FIG. 6A is a detail image, or reflectivity layer, as generated from the video image of FIG. 6C, in accordance with the system and method of the present application.
Figure 6B:
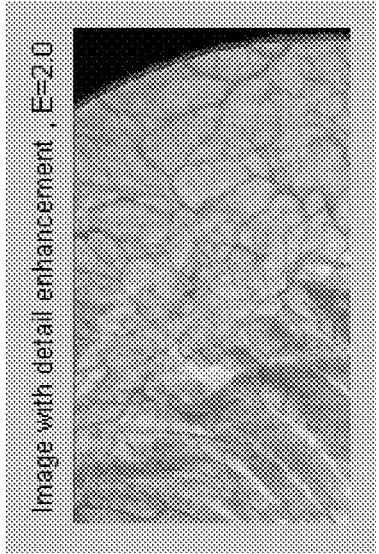
FIG. 6B is an enhanced detailed image, as generated from the detailed image of FIG. 6A, in accordance with the system and method of the present application.
Figure 6C:
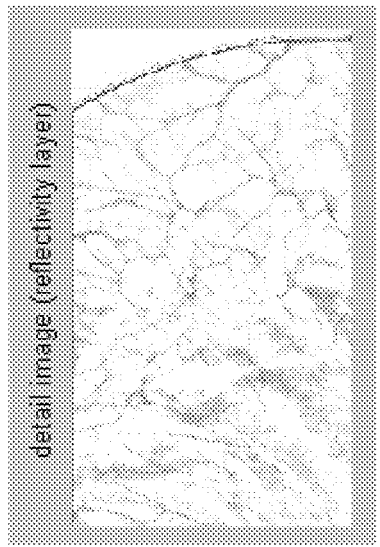
FIG. 6C is an unprocessed video image, shown in color.
Figure 6D:
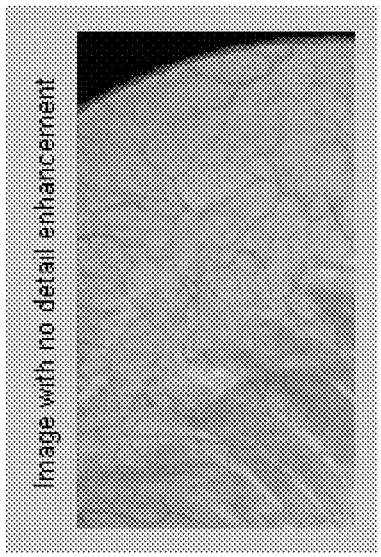
FIG. 6D is a video image with detail enhancement, generated in accordance with the system and method of the present application.

FIG. 5A shows the base image and FIG. 5B shows the compressed base image, using compression factor C=0.3.

In regions where the signal to noise ratio is expected to be very poor (in very dark regions), the compression may be locally suppressed as a function of the luminance or max(R,G,B) signal. In other words, the effect is now to boost lightness in dark—but not excessively dark—areas. Very dark areas (such as the black perimeter) are only slightly boosted, if at all, because there is no detail to see there but noise. Moreover, because the user is particularly sensitive to changes in black level, the darkest signals should be preserved. This approach is termed, "noise-aware compression."

A similar and complimentary approach to the above method is to reduce noise more aggressively where higher gain is to be applied. This approach is termed "compression-aware denoising" and can be accomplished by suppressing detail where it primarily consists of noise.

In a separate process the details_image 26 can additionally be contrast enhanced in the local detail enhancement module 16 before it is combined back with the base_layer_compressed 28. An example for a contrast enhancement can be a non-linear filter using an exponential pixel intensity mapping function like:

$$CE[Y_{details}]_{x,y} = Y_{x,y}^E$$

Where I is the input image (here the detail Image) with {I, 0 . . . 1} and E is an exponent {E, E>1} with. The Contrast enhancement function CE is applied to each pixel of the input image I and the output is the enhanced detail image 30. The resulting detail image enhancement can be observed in FIGS. 6A-6D.

In a more sophisticated approach, the contrast enhancement can be applied to only a specific frequency sub-band of the image. The shape of the band pass filter has to be determined empirically and based on the noise frequencies to avoid increasing the gain of the noise.

As the processing power necessary to run the DCE system 10 is relatively expensive, the DCE system 10 functionality may be separable from the main processing function of a camera control unit. For example, the overall imaging system may be designed such that the DCE system 10 may only be turned on when specific camera heads are connected to a head module. The head module may be capable of being produced in two versions: one with DCE and one without DCE.

The inputs to the DCE system 10 may be: (1) linear RGB (36 bit, 12 bit per channel); (2) global mean level accumulator value; (3) Parameter: Target mean level. The outputs may be: (1) Linear RGB (42 bit, 14 bit per channel); and (2) Exposure setpoint. Optionally, the computed Gain map can be output to support any other local adaptive processing down the processing pipeline.

The filter kernel width for the separable bilateral filter may be at least 41 horizontally and 41 vertical for a sensor of 960×540. The bilateral filter may be applied pre up-sampling to 960×540. The frequency response of the spatial filter coefficients of the bilateral filter shall be determined empirically. The kernel coefficients shall be settable during runtime.

Regarding the user options: 1) The user may have control over the strength of the compression for the areas of average image brightness below the target mean level using a slider type control or a selection of different settings in the setup menu; 2) The user may have control over the strength of the compression for the areas of average image brightness above the target mean level using a slider type control or a selection of different settings in the setup menu; and 3) The control of low medium and high brightness settings used in imaging systems to control the exposure target value or setpoint settings can be combined with the strength of the compression to allow for easier configuration of the overall brightness appearance which in fact can be a combination of target mean level and compression.

Figure 7:
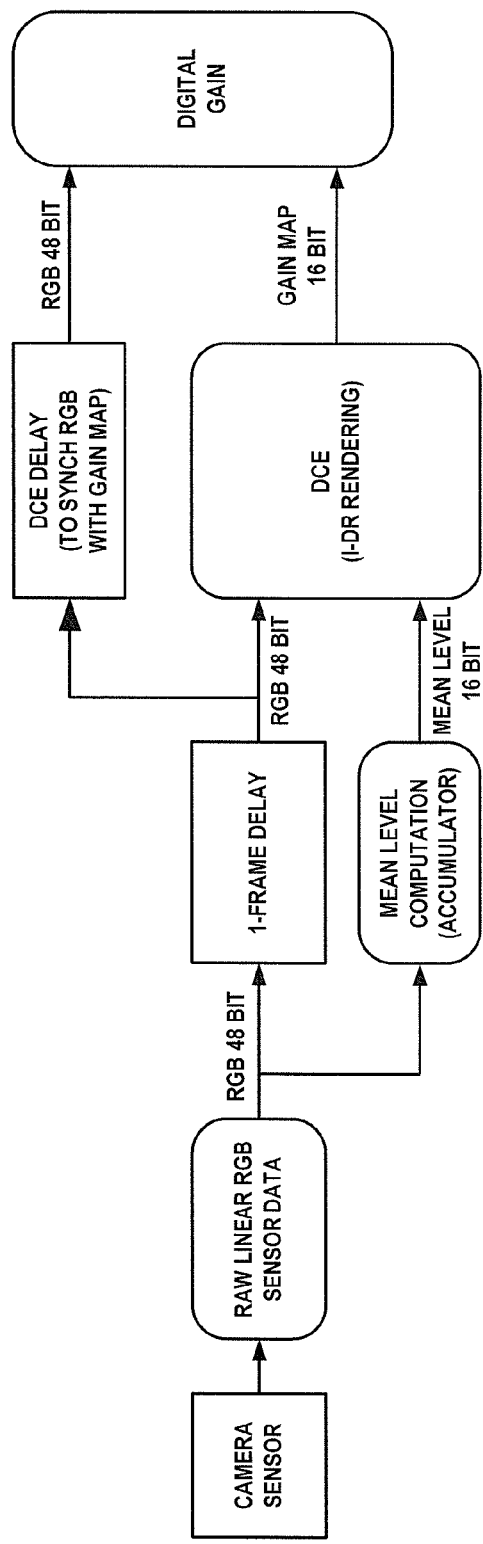
FIG. 7 is a flow chart of an embodiment of an implementation of the system of the present application using a two port memory with two frame buffers.
Figure 8:
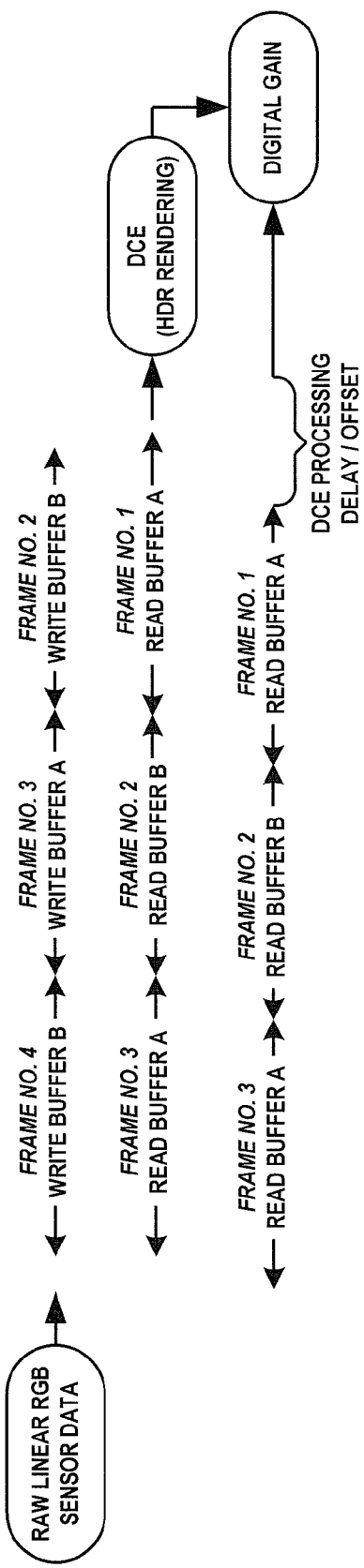
FIG. 8 is a flow chart of another embodiment of an implementation of the system of the present application using a larger memory buffer.

FIGS. 7 and 8 illustrate how the DCE system 10 can be integrated into a surgical imaging system. Reading the input to the Digital Gain with a time offset equal to the DCE delay is needed to synchronize raw RGB video with the filter output. The "1-frame" and "DCE delay" could be accomplished with a two port memory with 2 frame buffers, as shown in FIG. 7. Because of the read out offsets, the new frame coming in from the CCD has to be written to alternating buffers. Or, as shown in FIG. 8, a larger memory buffer (frame size plus DCE delay) may be used by continuously changing the starting address. The two external memory delays/buffers would be: (1) 1 frame delay to accelerate digital gain exposure; (2) around 100 lines delay to synchronize raw RGB data with digital Gain map from DCE. Delays 1 and 2 will add up to a minimum of 1 frame plus 100 lines of delay. While the previous frame is read out from first buffer and processed by DCE the current/new sensor frame is written to the second buffer.

One quality consideration of the system is that the DCE system 10 may adjust the dynamic range of a digital image to improve the viewing experience when displaying the image on a display/monitor device. The main goals may be:
- partially remove illumination artifacts like vignetting;
- improve lightness in badly illuminated areas of the captured scene; and
- minimize the extent of local aperture adaptation of the iris in the human eye.

To avoid a perceptual unacceptable loss of contrast for the relevant features of the scene only the image layer extracted by the bilateral filter shall be corrected. The bilateral filter is used to estimate for the perceptual layer of illumination and large reflectivity differences in a scene. The optimal parameterization of the bilateral filter is determined experimentally. The corrections mainly consist in a dynamic range compression of the layer extracted by the bilateral filter. Optionally, the difference image [log 2(originalImage)-log 2(bilateralFiltered] can be contrast enhanced before merging both layers back together.

Because the characteristic vignetting and light distribution produced by a single light source illuminator attached to the tip of the scope often aids the surgeon's depth perception of the scene, a complete removal of these artifacts is not entirely desirable. The optimal strength of the correction is determined experimentally and might vary among scenes and procedures. The DCE implementation may allow for these adjustments through published register settings (see section User Menu/Options).

The overall quality of the dynamic range compression is linked to the sharpness/contrast criteria mentioned in the "Sharpness/contrast" section. A quality metric that would purely target the compression can be the difference in aperture change of the human eye's iris to a series of video surgery scenes viewed under the same conditions as in the OR. The smaller the iris aperture changes the better the compression. Though, the limiting factor for the compression is the perceptual quality for contrast and sharpness. Only if both, compression and sharpness are of good quality the overall quality can improve over the original image.

Another quality consideration is noise performance. The DCE applies digital gain locally to the areas determined by the bilateral filter. For the areas with low lightness, those below the target mean level, the gain value is >1. There is also the option to apply a highlight compression in which case the gain value for areas above the target mean level would <1. In case of additive noise (e.g. read noise) the areas where gain >1 is applied to achieve a higher mean level the SNR will decrease compared to areas of equal mean level with no added gain. The result is a loss of perceptual image quality. The maximum gain allowed shall be a tunable parameter to avoid excessive gain. To determine the maximum gain value a subjective visual test shall be performed equal to the test for low light gain conditions (reference). Thus, the maximum digital gain allowed for the DCE enhancement shall not exceed the maximum gain allowed for low light conditions.

A possible quality metric would be the image SNR. The SNR post DCE shall not be smaller than the SNR for the maximum low light gain condition (reference to auto exposure).

DCE may also introduce quantization noise due limited precision in the processing pipeline. The SNR post DCE shall not be smaller than the SNR for the maximum low light gain condition (reference to auto exposure).

Color, another performance metric, in this context is defined as the ratio of the digital RGB pixel values of the processed sensor image that is input to the DCE. The image processed by the DCE shall not introduce any significant distortion to the original ratio of RGB pixel values.

The following RGB color error could be introduced by DCE: Due to the locally applied digital gain one of the RGB channels could clip at the maximum allowed signal value per channel. Though, In normal operation the positive gain applied by DCE will only be present in areas with an average mean level below the target mean level and the post correction mean level of these area will not exceed the target mean level. Thus, clipping is not expected to occur in normal operation, which uses a target mean level below 50% signal range in linear RGB.

If the sensor output is non-linear for lower signal levels, color errors due to this non-linearity can become perceptually more noticeable to the observer because DCE in general applies digital gain to areas of low lightness in the image. The DCE does not compensate for non-linearity. If compensation for non-linearity is desired a separate process has to be designed.

Based on the frequency response of the spatial filter coefficients of the bilateral filter the contrast for the higher frequencies shall be maintained while the lower frequencies shall be attenuated compared to the original. The attenuation of the higher frequencies. The less attenuation occurs, the better the expected perceptual quality.

The frequency response of the bi-lateral filter may also be adjusted. Based on subjective evaluation of live video and recorded video sequences the following goals are defined:
- find best settings for implementation constrained filter parameters:
  - maximum digital gain for dark image regions
  - compression gain for sub target average video level
  - bilateral filter intensity based weight coefficients
  - bilateral filter spatial weight coefficients
  - target average video level pre DCE correction
- find acceptable constrains for implementation on FPGA
  - bilateral filter aperture size
  - precision of intensity based weight coefficients
- capture HD raw data reference sequences of surgical footage
  - sequences worst case scenarios
  - sequences of normal operation The typical viewing/surround conditions encountered in an OR are used for tuning, including the same viewing distance as in the OR. Two CCU-Monitors are placed next to each other, with one showing the CCU processed image. FIG. 8 shows an example of the tuning setup. The final tuning result may also be viewed on a BT.709 reference Monitor with adapted surround conditions (adjusted background illumination to compensate for lower luminance output (80 cd/sqm versus 300-500 cd/sqm on the OR Monitors)) to ensure that it would still look good on a standard compliant type Monitor. Tuning is performed by the main tuning observer or a person familiar with the tuning parameters. The tuning and the final parameters are logged in a database to allow for post evaluation. The tuning observer is presented with prerecorded videos and/or shall use a live camera image.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A method for real time luminance correction and detail enhancement of a video image, comprising:
   calculating a luminance component of each pixel of each frame of a real-time video image signal;
   converting the luminance component into log space to generate a log luminance component;
   generating a base image for each frame of a video image signal by applying an adaptive bilateral filter to said log luminance component of each pixel in said frame;
   generating a detail image for each frame of a video input signal by taking the difference between said log luminance component of each pixel in said frame and said base image;
   identifying any dark pixels in the base image;
   generating a compressed base image by linearly compressing dark pixels in the base image towards a setpoint using a linear function in log space according to the following formula:

$$\text{Base image compressed}_{x,y} = 2^{(C\,[log\,2(Base\_image_{x,y}) - log\,2(M_{target})] + log\,2(M_{target}))}$$

Where $Base\_image_{x,y}$ is the base image generated by applying said adaptive bilateral filter to said log luminance component of each pixel in said frame, C is the compression factor $\{0,1\}$ and $M_{target}$ is a target mean level;
   generating an enhanced luminance image for each frame of said video input signal by adding the detailed image to the compressed base image;
   generating a log gain map for each frame of a video input signal by subtracting the log luminance component from the enhanced luminance image for said frame;
   converting the log gain map to a linear gain map with an antilog conversion; and
   multiplying the linear gain map to each RGB channel of a video display independently.

2. The method of claim 1 wherein said luminance component is calculated according to the following formula:

$$Y_{x,y} = [R\ G\ B]_{x,y} \times \begin{bmatrix} y_r \\ y_g \\ y_b \end{bmatrix}$$

Where R,G and B are the values of red, green and blue pixels, subscripts x,y relate to a location of a pixel, and $y_r$, $y_g$ and $y_b$ are luminance coefficients for red, green and blue color channels.

3. The method of claim 2 wherein said base image is generated according to the following formula:

$$Base\_image_{x,y} = 2^{BF[log2(Y_{x,y})]_{x,y}}$$

Where, $$BF[Y]_{x,y} = \frac{1}{W(x,y)} \sum_{n=x-\frac{(ks-1)}{2}}^{x+\frac{(ks-1)}{2}} \sum_{m=y-\frac{(ks-1)}{2}}^{y+\frac{(ks-1)}{2}} G_\sigma(|x-n|)$$

$$G_\sigma(|y-m|)G_\sigma(|Y(x,y)-Y(n,m)|)Y(n,m);$$

$$G_\sigma(x) = \frac{1}{2\pi\sigma^2}\exp\left(-\frac{x^2}{2\sigma^2}\right);\text{ and}$$

$$W(x,y) =$$
$$\sum_{n=x-\frac{(ks-1)}{2}}^{x+\frac{(ks-1)}{2}} \sum_{m=y-\frac{(ks-1)}{2}}^{y+\frac{(ks-1)}{2}} G_\sigma(|x-n|)G_\sigma(|y-m|)G_\sigma(|Y(x,y)-Y(n,m)|),$$

Where ks is kernel size and where $G_\sigma$ is a Gaussian weighting coefficient.

4. The method of claim 3 wherein said detail image is generated according to the following formula:

$$Detail\_image_{x,y} = \frac{Y_{x,y}}{Base\_image_{x,y}}$$

5. The method of claim 1 wherein said luminance component is calculated by deriving a max(R,G,B) component from the video input signal.

6. The method of claim 1 further comprising the step of generating an enhanced detail image by adding a gain to each pixel of the detail image.

7. The method of claim 6 wherein said enhanced detailed image is generated according to the following formula:

$$CE[Y_{details}]_{x,y} = Y_{x,y}^E$$

Where I is the input image (here the detail Image) with $\{I, 0...1\}$, E is an exponent $\{E, E>1\}$, and the contrast enhancement function CE is applied to each pixel of the input image I and the output is the enhanced detail image $Y_{x,y}^E$.

8. A system for real time luminance correction and detail enhancement of a video image, the system comprising:
   a memory for storing image data; and
   a processor, said processor configured to execute:
      a bilateral low-pass filter;
      a tone-compression module; and
      a local detail enhancement module,
   wherein said system is configured to perform a method of:
      calculating a luminance component of each pixel of each frame of a real-time video image signal;
      converting the luminance component into log space to generate a log luminance component;
      generating a base image for each frame of a video image signal by applying an adaptive bilateral filter to said log luminance component of each pixel in said frame;
      generating a detail image for each frame of a video input signal by taking the difference between said log luminance component of each pixel in said frame and said base image;
      identifying any dark pixels in the base image;
      generating a compressed base image by linearly compressing dark pixels in the base image towards a setpoint using a linear function in log space according to the following formula:

$$\text{Base image compressed}_{x,y} = 2^{(C\,[log\,2(Base\_image_{x,y}) - log\,2(M_{target})] + log\,2(M_{target}))}$$

Where Base _image$_{x,y}$ is the base image generated by applying said adaptive bilateral filter to said log luminance component of each pixel in said frame, C is the compression factor {0,1} and M$_{target}$ is a target mean level;

generating an enhanced luminance image for each frame of said video input signal by adding the detailed image to the compressed base image;

generating a log gain map for each frame of a video input signal by subtracting the log luminance component from the enhanced luminance image for said frame;

converting the log gain map to a linear gain map with an antilog conversion; and multiplying the linear gain map to each RGB channel of a video display independently.

9. The system of claim 8 wherein said bilateral lowpass filter is represented by the formula:

$$BF[Y]_{x,y} = \frac{1}{W(x,y)} \sum_{n=x-\frac{(ks-1)}{2}}^{x+\frac{(ks-1)}{2}} \sum_{m=y-\frac{(ks-1)}{2}}^{y+\frac{(ks-1)}{2}} G_\sigma(|x-n|)$$

$$G_\sigma(|y-m|)G_\sigma(|Y(x,y)-Y(n,m)|)Y(n,m);$$

Where, $$G_\sigma(x) = \frac{1}{2\pi\sigma^2}\exp\left(-\frac{x^2}{2\sigma^2}\right);$$

$$Y_{x,y} = [R\ G\ B]_{x,y} \times \begin{bmatrix} y_r \\ y_g \\ y_b \end{bmatrix},$$

where R,G and B are the values of the red, green and blue pixels, subscripts x,y relate to a location of a pixel, yr, yg and yb are the luminance coefficients for the red, green and blue color channels to compute the luminance output Y and where ks is kernel size and where G$_\sigma$ is a Gaussian weighting coefficient; and $$W(x,y) = \sum_{n=x-\frac{(ks-1)}{2}}^{x+\frac{(ks-1)}{2}} \sum_{m=y-\frac{(ks-1)}{2}}^{y+\frac{(ks-1)}{2}} G_\sigma(|x-n|)G_\sigma(|y-m|)G_\sigma(|Y(x,y)-Y(n,m)|).$$

10. The system of claim 8 wherein said tone-compression module is configured to compress the dynamic range of said image towards a setpoint.

11. The system of claim 8 wherein said local detail enhancement module is provided as a non-linear filter represented by the following formula:

$$CE[Y_{details}]_{x,y} = Y_{x,y}^E$$

Where I is an image input to said local detail enhancement module, with {I,0...1}, E is an exponent {E, E >1}, and the contrast enhancement function CE is applied to each pixel of the input image I and the output is the enhanced detail image $Y_{x,y}^E$.

12. A method for real time luminance correction and detail enhancement of a video image, comprising:

extracting a luminance component from said video image;

separating said luminance component into an illumination layer and a scene reflectivity layer, said illumination layer having a dynamic range;

compressing the dynamic range of said illumination layer to generate a corrected illumination layer using a linear compression function in log space according to the following formula:

$$\text{Base image compressed}_{x,y} = 2^{(C[\log 2(Base\_image_{x,y}) - \log 2(M_{target})] + \log 2(M_{target}))}$$

Where Base_image$_{x,y}$ is said illumination layer separated from said luminance component, C is the comprseeion factor {0,1} and M$_{target}$ is a target mean level;

filtering said reflectivity layer to generate an enhanced reflectivity layer; and combining said corrected illumination layer with said enhanced scene reflectivity layer to generate an enhanced luminance image.

13. The method of claim 12 wherein said luminance component is provided as a max(R,G,B) component.

14. The method of claim 12 wherein the step of compressing the dynamic range of said illumination layer comprises increasing the lightness of dark regions of said image.

15. The method of claim 12 wherein the step of compressing the dynamic range of said illumination layer comprises decreasing the lightness of over-illuminated regions of said image.

16. The method of claim 12 wherein the step of filtering said reflectivity layer comprises applying a non-linear filter using an exponential pixel intensity mapping function.

17. The method of claim 12 wherein the step of filtering said reflectivity layer comprising applying a band-pass filter having a specific frequency sub-band of said image.

18. A method for real time luminance correction and detail enhancement of a video image, comprising:

calculating a luminance component of each pixel of each frame of a real-time video image signal;

converting the luminance component into log space to generate a log luminance component;

generating a base image for each frame of a video image signal by applying an adaptive bilateral filter to said log luminance component of each pixel in said frame;

generating a detail image for each frame of a video input signal by taking the difference between said log luminance component of each pixel in said frame and said base image;

identifying any dark pixels in the base image;

generating a compressed base image by linearly compressing dark pixels in the base image towards a setpoint;

generating an enhanced luminance image for each frame of said video input signal by adding the detailed image to the compressed base image;

generating a log gain map for each frame of a video input signal by subtracting the log luminance component from the enhanced luminance image for said frame; and converting the log gain map to a linear gain map with an antilog conversion;

multiplying the linear gain map to each RGB channel of a video display independently, wherein said luminance component is calculated according to the following formula:

$$Y_{x,y} = [R\ G\ B]_{x,y} \times \begin{bmatrix} y_r \\ y_g \\ y_b \end{bmatrix}$$

where R,G and B are the values of red, green and blue pixels, subscripts x,y relate to a location of a pixel, and y$_r$, y$_g$ and y$_b$ are luminance coefficients for red, green and blue color channels to compute the luminance output Y, wherein said base image is generated according to the following formula:

$$\text{Base\_image}_{x,y} = 2^{BF[\log 2(Y_{x,y})]_{x,y}}$$

Where, $$BF[Y]_{x,y} = \frac{1}{W(x,y)} \sum_{n=x-\frac{(ks-1)}{2}}^{x+\frac{(ks-1)}{2}} \sum_{m=y-\frac{(ks-1)}{2}}^{y+\frac{(ks-1)}{2}} G_\sigma(|x-n|)G_\sigma(|y-m|)G_\sigma(|Y(x,y)-Y(n,m)|)Y(n,m);$$

$$G_\sigma(x) = \frac{1}{2\pi\sigma^2}\exp\left(-\frac{x^2}{2\sigma^2}\right); \text{ and}$$

$$W(x,y) = \sum_{n=x-\frac{(ks-1)}{2}}^{x+\frac{(ks-1)}{2}} \sum_{m=y-\frac{(ks-1)}{2}}^{y+\frac{(ks-1)}{2}} G_\sigma(|x-n|)G_\sigma(|y-m|)G_\sigma(|Y(x,y)-Y(n,m)|),$$

Where, ks is kernel size and where $G_\sigma$ a is a Gaussian weighting coefficient; and wherein said compressed base image is generated according to the following formula:

$$\text{Base\_image\_compressed}_{x,y} = 2^{(C[\log 2(\text{Base\_image}_{x,y}) - \log 2(M_{target})] + \log 2(M_{target}))}$$

Where C is the compression factor $\{0,1\}$ and $M_{target}$ is a target mean level.

* * * * *